US007831090B1

(12) United States Patent
Krishnan et al.

(10) Patent No.: US 7,831,090 B1
(45) Date of Patent: Nov. 9, 2010

(54) GLOBAL REGISTRATION OF MULTIPLE 3D POINT SETS VIA OPTIMIZATION ON A MANIFOLD

(75) Inventors: Shankar Krishnan, Chatham, NJ (US); Pei Yean Lee, Canberra (AU); John Barrett Moore, Cambell (AU); Suresh Venkatasubramanian, Philadelphia, PA (US)

(73) Assignee: AT&T Intellecutal Property II, L.P., Reno, NV (US)

( * ) Notice: Subject to any disclaimer, the term of this patent is extended or adjusted under 35 U.S.C. 154(b) by 1167 days.

(21) Appl. No.: 11/480,044

(22) Filed: Jun. 30, 2006

(51) Int. Cl.
*G06K 9/00* (2006.01)
*G06T 15/00* (2006.01)
(52) U.S. Cl. .................. 382/154; 382/128; 345/419
(58) Field of Classification Search .............. 382/128, 382/154, 100, 141, 145, 181, 190, 195, 205, 382/148, 172, 168, 152, 149; 342/96, 90; 600/429, 443, 426, 427; 345/419, 422; 435/6, 435/91.2; 250/491.1, 306, 310, 311, 559.42; 606/130; 536/24.3; 128/916; 356/237.1, 356/237.2, 601, 613; 430/504, 903, 111.41, 430/505, 957, 544, 359, 212, 523, 904, 122.51, 430/506, 84, 379, 567; 348/126, 128, 616; 702/189
See application file for complete search history.

(56) References Cited

U.S. PATENT DOCUMENTS

| 4,969,036 | A | * | 11/1990 | Bhanu et al. ............. 348/113 |
| 5,633,951 | A | | 5/1997 | Moshfeghi |
| 5,839,440 | A | | 11/1998 | Liou et al. |
| 6,668,082 | B1 | * | 12/2003 | Davison et al. ........... 382/190 |
| 6,754,379 | B2 | | 6/2004 | Xiong et al. |
| 6,999,811 | B2 | | 2/2006 | Koppe et al. |
| 7,477,762 | B2 | * | 1/2009 | Zhang et al. ............. 382/107 |
| 2005/0249398 | A1 | | 11/2005 | Khamene et al. |
| 2007/0013710 | A1 | * | 1/2007 | Higgins et al. ........... 345/581 |

OTHER PUBLICATIONS

Krishnan, S., et al., Global Registration of Multiple 3D Point Sets Via Optimization-On-A-Manifold, Eurographics Symposium on Geometry Processing, (2005).*
Adler, et al., "Newton's Method on Riemannian Manifolds and a Geometric Model for the Human Spine", IMA Journal of Numerical Analysis 22 (2002).
Arun, et al., "Least Squares Fitting of Two 3D Point Sets", IEEE PAMI. (1987), pp. 698-700.
Besl, et al., "A Method for Registration of 3D Shapes", IEEE PAMI. 14, 2 (1992), pp. 239-256.

(Continued)

*Primary Examiner*—Sheela C Chawan (57) ABSTRACT

A method for registering multiple 3D point sets by determining optimal relative positions and orientations of the 3D point sets. Initial values are determined for the rotation matrices corresponding to the relative orientations of reference frames of the 3D point sets. A registration error cost function is optimized on a product manifold of all of the rotation matrices to determine optimal values of the rotation matrices. The optimal values of the rotation matrices are used to determine optimal values for translation vectors corresponding to the relative positions of the reference frames of the 3D point sets. The 3D point sets are registered on a common reference frame using the optimal rotation matrices and the optimal translation vectors.

23 Claims, 3 Drawing Sheets

OTHER PUBLICATIONS

Benjemaa, et al., "A Solution for the Registration of Multiple 3D Point Sets Using Unit Quaternions", In Proc. ECCV (1998), pp. 34-50.

Eggert, et al., "Simultaneous Registration of Multiple Range Views for Use in Reverse Engineering of CAD Models", Comput. Vis. Image Underst. 69, 3 (1998).

Horn, K.P., "Closed Form Solution of Absolute Orientation Using Unit Quaternions", Journal of the Optical Society of America A (1997).

Lee, P.Y., "Geometric Optimization for Computer Vision", PhD Thesis, Australian National University, 2005.

Lee, et al., "Pose Estimation Via a Gauss-Newton-on-Manifold-Approach", In 16th Int'l Symposium on Mathematical Theory of Network and System, (MTNS) 2004.

Pottmann, et al., "Geometry and Convergence Analysis of Algorithms for Registration of 3D Shapes", Tech. Rep. 117, TU Wien, 2004.

Pulli, K., "Multiview Registration for Large Data Sets", In Proc. 3DIM, (1999).

Williams, J., et al., "Simultaneous Registration of Multiple Corresponding Point Sets", Comput. Vis. Image Underst. 81, 1 (2001), pp. 117-142.

* cited by examiner

GLOBAL REGISTRATION OF MULTIPLE 3D POINT SETS VIA OPTIMIZATION ON A MANIFOLD

BACKGROUND OF THE INVENTION

The present invention is generally directed to registration of multiple 3D point sets to construct a 3D computer model. More specifically, the present invention is directed to registration of multiple 3D point sets via optimization on a manifold.

Constructing a three dimensional (3D) computer model of a real object from 3D surface measurement data has various applications in computer graphics, virtual reality, computer vision, and reverse engineering. To construct such a model, a 3D scanner can be used to gather surface measurement data of an object. However, a single view of an object is often insufficient due to self occlusion, the presence of shadows, and limitations of the field of view of the 3D scanner. Therefore, multiple partial views of the object are needed to provide surface measurement data for the entire object.

Typically, multiple overlapping views are obtained from multiple 3D scanners or from a single 3D scanner positioned at different positions and orientations with respect to an object. Multiple overlapping views can also be obtained from a 3D scanner in a fixed position taking time sampled images of an object on a moving turntable. Each view or image taken of the object consists of a 3D point set representing features of the surface of the object on a reference frame or coordinate system with an origin at a location of the 3D scanner used to obtain the 3D point set. However, the relative position and orientation between the views are known imprecisely or not at all. Accordingly, in order to generate a computer 3D model, the overlapping views must be combined, or "registered", within a common reference frame or coordinate system by determining the relative position and orientation between the views.

Two-view registration is a well-studied problem in the art. As known in the art, a closed-form solution can be used to obtain the relative position and orientation of two 3D point sets, such that the least squared error between overlapping points of the two 3D point sets is minimized.

Multiview registration, however, is a more difficult problem. There are two strategies that can be used in order to register three or more views, local (sequential) registration and global (simultaneous) registration. Local registration involves sequentially aligning two overlapping views at a time followed by an integration step to ensure that all views are combined. However, local registration does not give an optimal solution because errors can accumulate and propagate when registering each sequential pair of views.

Global registration refers to registering all of the multiple views simultaneously by distributing the registration error evenly over all of the views. In this case an error function can be expressed in terms of translation vectors, which correspond to a relative position of an origin of a coordinate system for each view, and rotational matrices, which correspond to a relative rotational orientation of the coordinate system of each view. However, this error function is a non-convex function which is difficult to minimize globally. Conventional optimization approaches for minimizing the error function do not consistently converge at an optimum solution for the relative positions and orientations of the coordinate systems of the view. Accordingly, both conventional local and global registration techniques do not minimize the registration error, which is desirable when registering 3D point sets.

BRIEF SUMMARY OF THE INVENTION

The present invention is directed to a global method of registering multiple 3D point sets by determining relative positions and orientations of reference frames of the 3D point sets. This method converges quickly and accurately to optimal values for rotation matrices corresponding to the relative orientations of the 3D point sets by optimizing a registration error cost function on a product manifold of all of the rotation matrices. The product manifold can be many copies (i.e., a product) of a three-dimensional special orthogonal group ($SO_3$), which is the manifold of each rotation matrix.

In an embodiment of the present invention, initial values of rotational matrices corresponding to relative orientations of reference frames of multiple 3D point sets can be determined based on correspondence values between the 3D point sets. These initial values are determined using a closed form solution which gives optimal values of the rotation matrices in a noise free case. A registration error cost function is optimized on a product manifold of all of the rotation matrices starting with the determined initial values to determine optimal values for the rotation matrices. The optimization can be an iterative process to minimize the cost function while remaining on the product manifold of all of the rotational matrices. Optimal values of translation vectors corresponding to the relative positions of the reference frames of the 3D point sets are calculated based on the determined optimal values of the rotation matrices. The optimal translation vectors and rotational matrices are used to register the 3D point sets on a common reference frame.

In the registration method according to an embodiment of the present invention, the cost function is reduced with each iteration of the optimization process. This guarantees that the optimization process will converge to an optimal (i.e., minimum) value for the cost function. Since the optimization is being performed on the product manifold of all of the rotational matrices, the point on the product manifold which minimizes the cost function is equivalent to the optimal values for the rotational matrices corresponding to the 3D point sets. Furthermore, the optimization process of the present invention converges to an optimal value quadratically.

These and other advantages of the invention will be apparent to those of ordinary skill in the art by reference to the following detailed description and the accompanying drawings.

DETAILED DESCRIPTION

In order to construct a computer model, a laser scanner can be used to obtain multiple overlapping 3D point sets ("views") corresponding to the surface of an object. Each overlapping 3D point set has a corresponding coordinate frame. According to an embodiment of the present invention, a registration method determines rigid body transformations between coordinate frames of the 3D point sets in order to align the 3D point sets into a common reference frame. The rigid body transformations can be expressed in terms of translation vectors T (relative position of the coordinate frames) and rotation matrices R (relative orientation of the coordinate frames).

A 3D object can be considered a set of 3D points $W := \{w^k \in R^3 | k=1, 2, \ldots, n\}$ in a 'world' reference frame. When multiple views are obtained for a 3D object, each view is obtained from a different vantage point (position) and viewing direction (orientation) and contains a point set having up to n 3D points. For each view, a translation vector t and a rotation matrix R respectively indicate the relative position and orientation of a coordinate frame of that view with respect to a reference coordinate frame. For N views, the relative rotations and translations can be denoted as $(R_1, t_1), \ldots, (R_N, t_N)$, that is, relative to the 'world' reference frame, where $R_i$ is a 3×3 rotation matrix, satisfying $R_i^T R_i = I_3$, det $(R_i) = +1$, and $t_i \in R^3$ is a translation vector. Each rotation matrix R is a point on a manifold of a three-dimensional special orthogonal group $(SO_3)$. A product manifold of N rotation matrices is the product manifold $SO_3^N$. Thus the Cartesian product of N rotation matrices R is a point on the product manifold $SO_3^N$.

The $i^{th}$ view consists of a point set having $n_i$ points $W_i := \{w_i^k \in R^3 | k=1, 2, \ldots, n_i\} \subset W$ and is denoted $V_i := \{v_i^k \in R^3 | k=1, 2, \ldots, n_i\}$ and consists of images of the $n_i$ points in $W_i$ with the relative rotation matrices and translation vectors given by $(R_i, t_i)$. Thus in a noise free case, $$w_i^k = R_i v_i^k + t_i, k=1, 2, \ldots, n_i. \quad (1)$$

When overlapping views are obtained, the points of one view that correspond to points in an overlapping view are known. Theses corresponding points in different view are referred to herein and correspondence values. Accordingly, $W_{ij} = W_i \cap W_j$ can be the set of $n_{ij}$ points in $W_i$ for which there are corresponding points in $W_j$, for i, j=1, 2, ..., N. That is, $W_{ij} = W_{ji}$ consists of $n_{ij} = n_{ji}$ points $w_{ij}^k = w_{ji}^k \in R^3$, k=1, ..., $n_{ij}$. In view $V_i$, the set of images of these points is denoted $V_{ij} := \{v_{ij}^k \in R^3 | k=1, 2, \ldots, n_{ij}\} \subset V_i$. In a noise free case, $$w_{ij}^k = R_i v_{ij}^k + t_i = R_j v_{ji}^k + t_j$$

$$\forall i, j=1, 2, \ldots, N, k=1, 2, \ldots, n_{ij}. \quad (2)$$

When there is measurement noise, cost function can be used to show error between corresponding points in overlapping views. Accordingly, the cost function can penalize the error $(R_i v_{ij}^k + t_i) - (R_j v_{ji}^k + t_j)$ for all i, j=1, 2, ..., N and k=1, 2, ..., $n_{ij}$. In one embodiment of the present invention, the cost function can be given by a sum of the squared Euclidean distances between the corresponding points in overlapping views. In this case the cost function can be expressed, $$g(R, T) = \sum_{i=1}^{N} \sum_{j=i+1}^{N} \sum_{k=1}^{nij} \|(R_i v_{ij}^k + t_i) - (R_j v_{ji}^k + t_j)\|^2, \quad (3)$$

$$= \sum_{i=1}^{N} \sum_{j=i+1}^{N} \sum_{k=1}^{nij} \left( \|R_i v_{ij}^k - R_j v_{ji}^k\|^2 + 2(t_i - t_j)^T (R_i v_{ij}^k - R_j v_{ji}^k) + \|t_i - t_j\|^2 \right).$$

Using matrix operations, it is possible to reformulate the cost function expressed in Equation 3. R is the Cartesian product of all of the rotational matrices, and T is the set of all of the translation vectors, as expressed below is Equations 4 and 5, respectively, $$R := [R_1 R_2 \ldots R_N] \in R^{3 \times 3N} \quad (4)$$

$$T := [t_1 t_2 \ldots t_N] \in R^{3 \times N}. \quad (5)$$

If $e_i$ denotes the $i^{th}$ column of an N×N identity matrix and $e_{ij} := e_i - e_j$, then:

$$R_i = R(e_i^T \otimes I_3), t_i = Te_i, t_i - t_j = Te_{ij}. \quad (6)$$

Using the correspondence values of overlapping views, a vector can be constructed such that $a_{ij}^k := (e_i^T \otimes I_3)v_{ij}^k - (e_j^T \otimes I_3)v_{ji}^k$. This vector can be combined with the value of $R_i$ from Equation 6, giving $R_i v_{ij}^k - R_j v_{ji}^k = Ra_{ij}^k$. Thus, $\|R_i v_{ij}^k - R_j v_{ji}^k\|^2 = Ra_{ij}^k \cdot Ra_{ij}^k$. Similarly substituting the value of $t_i$, the inner expression of Equation 3 can be rewritten as $Ra_{ij}^k \cdot Ra_{ij}^k + 2Te_{ij} \cdot Ra_{ij}^k + Te_{ij} \cdot Te_{ij}$.

It is possible to construct a matrix such that:

$$\begin{bmatrix} A & B \\ B^T & C \end{bmatrix} = \sum_{i=1}^{N} \sum_{j=i+1}^{N} \sum_{k=1}^{nij} \begin{bmatrix} a_{ij}^k \\ e_{ij} \end{bmatrix} [a_{ij}^{kT} \ e_{ij}^T] \geq 0. \quad (7)$$

Equation 7 can be used with a trace operation (tr), to rewrite the cost function. Using the fact that for vectors u and v, $u \cdot v = tr(uv^T)$, the cost function as expressed in Equation 3, can be rewritten as:

$$g(R, T) = tr(RAR^T + 2RBT^T + TCT^T) \quad (8)$$

$$= tr\left( [R \ J] \begin{bmatrix} A & B \\ B^T & C \end{bmatrix} \begin{bmatrix} R^T \\ J^T \end{bmatrix} \right) \geq 0.$$

The vec operation is a well know matrix operation. If a matrix X is an n×k matrix, vec(X) is a nk×1 vector form by writing the columns of X one at a time. It is well know that for two matrices X and Y, $tr(XY^T) = vec^T(X)vec(Y)$. Accordingly, the cost function as expressed in Equation 8 can be rewritten as:

$$g(R, T) = tr(RAR^T) + 2vec^T(T)vec(RB) + vec^T(T)$$
$$(C \otimes I_3)vec(T). \quad (9)$$

The cost function as expressed in Equation 9 is a quadratic function of vec(T). This function is convex, and thus has a unique minimum, if $C \otimes I_3$ is positive definite. An element $c_{ii}$ of C is equal to $\Sigma_{k \neq i} n_{ik}$ and $c_{ij} = -n_{ij}$ for $j \neq i$. This implies that C is singular, since C1 (where 1 is an all-ones vector) vanishes (C1=0, where 0 is a zero vector). This is a consequence of the fact that only relative transformations (i.e., orientation and position) of the coordinate frames of the views can be determined, and not absolute transformations. That is, it is only possible to determine the relative position and orientation of each coordinate frame with respect to the other coordinate frames. Accordingly, a coordinate frame of one of the views (i.e., a first coordinate frame corresponding to a first view) can be fixed as a reference frame such that $(R_i, t_i) = (I_3, 0)$, where 0 is a zero vector. The reference frame is used as a common coordinate frame for registering the 3d point sets of the multiple view. Since the coordinate frame of the first view can be fixed as the reference frame, the first row and the first column from all of the above described matrices can be removed.

Eliminating the first row and column from C leaves a matrix that is symmetric and strictly dominant, i.e., the absolute value of each diagonal element is strictly larger than the absolute values of off-diagonal entries in the same row. It is a basic property that such matrices are positive definite, which consequently implies that $C \otimes I_3$ is positive definite. Thus, the cost function g(R, T) has a unique minimum for a fixed R and varying T. Thus the value of T which minimizes the cost function can be expressed in terms of R as:

$$vec(T^*(R)) = -(C^{-1} \otimes I_3)vec(RB) = -vec(RBC^{-1})$$

$$T^*(R) = -RBC^{-1} \quad (10)$$

T*(R) as expressed in Equation 10 can be substituted into the cost function as expressed in Equation 8 in order to express the registration error cost function depending only on the rotation matrices R:

$$f(R) := g(R, T(R)) = tr(RMR)$$

$$= vec^T(R^T)(I_3 \otimes M)vec(R^T), \quad (11)$$

wherein $M := A - BC^{-1}B^T$.

Figure 1:
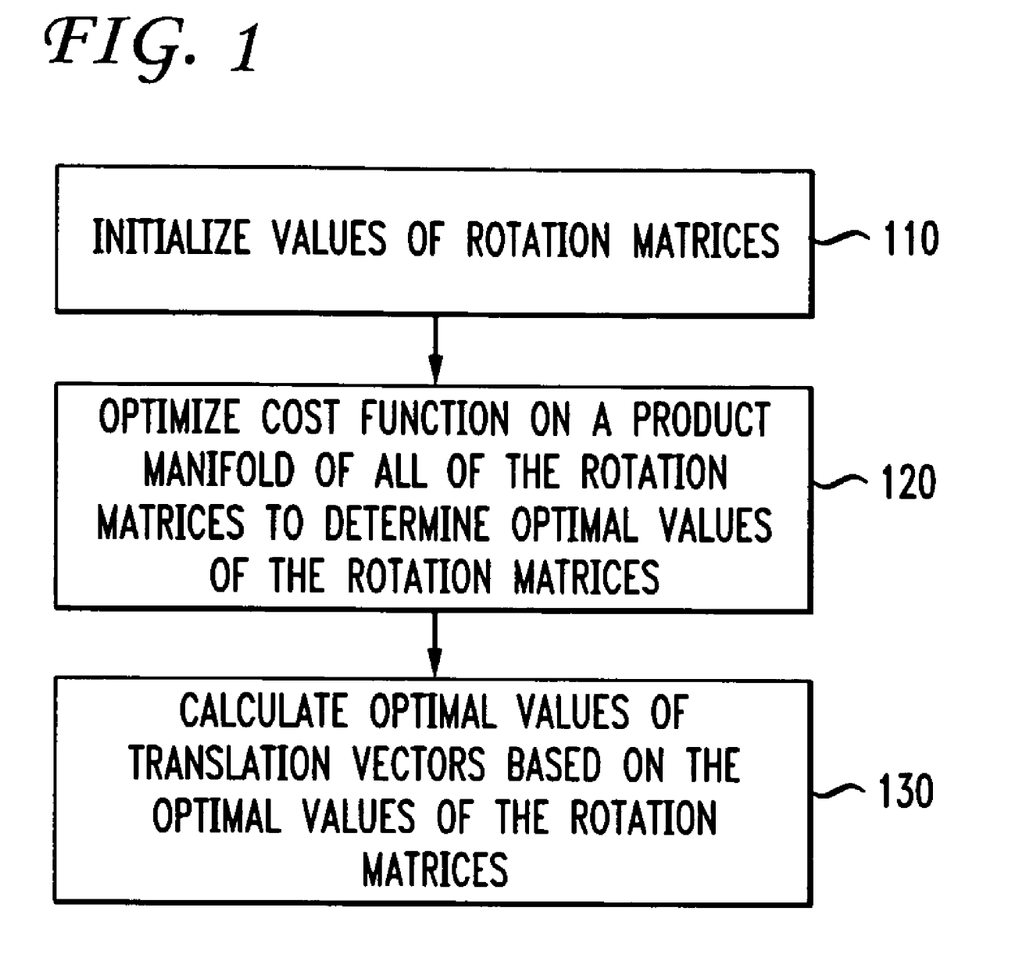
FIG. 1 illustrates a method of globally registering multiple 3D point sets according to an embodiment of the present invention.

The cost function as expressed in Equation 11 can be used to determine optimal rotation matrices which minimize the cost function in order to register multiple 3D point sets (views) with a minimal amount of registration error. FIG. 1 illustrates such a method of registering multiple 3D point sets according to an embodiment of the present invention. At step 110, values of the rotational matrices corresponding to the 3D point sets are initialized. That is, initial values of the rotational matrices are determined.

In a noise free case, for $R \in SO_3^N$, the optimal value of the cost function is zero, such that:

$$vec^T(R^T)vec(MR^T) = 0 \Rightarrow vec(MR^T) = 0$$

$$\Rightarrow MR^T = 0. \quad (12)$$

Since M is symmetric, a singular value decomposition of M gives an orthogonal matrix U as expressed below:

$$M = U\Sigma U^T = [U_a \ U_b] \begin{bmatrix} \Sigma_a & 0 \\ 0 & 0 \end{bmatrix} \begin{bmatrix} U_a^T \\ U_b^T \end{bmatrix} \Rightarrow MU_b = 0. \quad (13)$$

To obtain R such that $R_1 = I_3$, it is possible to define an orthogonal matrix $\hat{U}$ such that $\hat{U} := [I_3 \ 0]U_b$. Thus, in a noise free case, a closed form solution for the values of the rotation matrices can be determined to minimize the cost function. In a noise free case, this closed form solution can be used to obtain optimal values of the rotation matrices without an iterative optimization process. The closed form solution for the values of the rotational matrices can be expressed as:

$$R = \hat{U}^{-T} U_b^T. \quad (14)$$

However, in the presence of noise, the optimal cost function is no longer equal to zero. In this case, $U_b$ is chosen to be the set of right singular vectors associated with three least singular values of M, which may not be zero. These singular vectors might not be on the product manifold $SO_3^N$. Thus, an additional projection step can be used to obtain initial values of the rotation matrices that are on the product manifold $SO_3^N$. Denoting $G_i := \hat{U}^{-T} U_b^T (e_i \otimes I_3)$, the initial value for each rotation matrix can be expressed as:

$$R_i^{opt} = \arg \min_{R_i \in SO_3} \|R_i - G_i\| = \arg \max_{R_i \in SO_3} tr(R_i^T G_i). \quad (15)$$

By applying a singular value decomposition on $G_i$, it is possible to use Equation 15 to determine the initial value for each rotation matrix, as shown below:

$$G_i = W \wedge Z^T, \ R_i^{opt} = W \begin{bmatrix} I_2 & 0 \\ 0 & \det(WZ^T) \end{bmatrix} Z^T, \quad (16)$$

wherein, $\det(R_i^{opt}) = +1$.

At step 120, the cost function is optimized on the product manifold of all of the rotation matrices using the initial values of the rotation matrices to determine optimal values of the rotation matrices. As described above, the rotational matrix corresponding to each 3D point set is a point on a manifold of the special orthogonal (SO) group. In particular, each rotational matrix is a point on the manifold of $SO_3$. $SO_3$ denotes the group of 3×3 matrices with determinant +1, and $R_i \in SO_3$ for $i=1, \ldots, N$. Furthermore, R, which is the Cartesian product of all of the rotational matrices, is a point on a product manifold of $SO_3^N$.

As known in the art, a Lie group is defined as a differential manifold G equipped with a product $\cdot : G \times G \to G$ that satisfies the group axioms of associativity, identity, and has an inverse $p^{-1}$. Further, the maps $(p, r) \mapsto p \cdot r$, $p \mapsto p^{-1}$. A Lie algebra is defined herein as a linear space V equipped with a Lie bracket, which is a bilinear skew-symmetric mapping $[\cdot, \cdot] : V \times V \to V$ that obeys the following properties:

Skew Symmetry: $[F, G] = -[G, F]$;
Scalar Multipliers: $[\alpha F, G] = \alpha [F, G] \forall \alpha \in R$;
Bilinearity: $[F+G, H] = [F, H] + [G, H]$; and
Jacobi's Indentity: $[F, [G, H]] + [G, [H, F]] + [H, [F, G]] = 0$.

A vector field on a manifold G is a function that maps a point p on G to an element of the tangent space $T_p(G)$. A left invariant vector field X is a vector field such that for all $g \in G$, $XL_g = L_g X$, where X is viewed as a differential operator and $L_g[f](x) = f(g \cdot x)$. The vector space of al left invariant vector fields over a Lie group G is a Lie algebra with the operator $[X, Y] = XY - YX$, and is considered the associated Lie algebra g.

$SO_3$ is a Lie group with the group operator being matrix multiplication. Its associated Lie algebra $so_3$ is the set of 3×3 skew symmetric matrices of the form:

$$\Omega = \begin{bmatrix} 0 & -\omega_z & \omega_y \\ \omega_z & 0 & -\omega_x \\ -\omega_y & \omega_x & 0 \end{bmatrix}. \quad (17)$$

There is a well known isomorphism from the Lie algebra $(R^3, \times)$ to the Lie algebra $(so_3, [\cdot, \cdot])$, wherein × denotes the cross product and $[\cdot, \cdot]$ denotes the matrix communicator. This allows $so_3$ to be identified with $R^3$ using the mapping expressed in Equation 17, which maps a vector $\omega = [\omega_x \ \omega_y \ \omega_z] \in R^3$ to a matrix $\Omega \in so_3$. This isomorphism is expressed in Equations 18 and 19 below:

$$Q_x := \begin{bmatrix} 0 & 0 & 0 \\ 0 & 0 & -1 \\ 0 & 1 & 0 \end{bmatrix}, Q_y := \begin{bmatrix} 0 & 0 & 1 \\ 0 & 0 & 0 \\ -1 & 0 & 0 \end{bmatrix}, \text{ and } Q_z := \begin{bmatrix} 0 & -1 & 0 \\ 1 & 0 & 0 \\ 0 & 0 & 0 \end{bmatrix}; \quad (18)$$

$$\Omega = \Omega(\omega) = Q_x \omega_x + Q_y \omega_y + Q_z \omega_z. \quad (19)$$

An identity which is used in optimizing the cost function is $vec(\Omega^T) = Q\omega$. The optimization is performed on an N-fold product of $SO_3$ which is a smooth manifold of dimension 3N, given by:

$$SO_3^N = \overbrace{SO_3 \times \ldots \times SO_3}^{N \text{ times}}. \quad (20)$$

The tangent space of $SO_3$ at any point $R_i$ (i.e., rotation matrix) on the $SO_3$ manifold is defined as $T_{R_i} SO_3 = \{R_i \Omega_i | \Omega_i \in so_3\}$, and the affine tangent space is $T_{R_i}^{aff} SO_3 = \{R_i + R_i \Omega_i | \Omega_i \in so_3\}$. It is possible to define:

$$\tilde{\Omega} := \Omega_1 \oplus \Omega_2 \oplus \ldots \oplus \Omega_N, \ \Omega_i \in so_3. \quad (21)$$

Due to the isomorphism described above, the tangent space of the product manifold of $SO_3^N$ a point $R = [R_1 \ R_2 \ldots R_N]$(i.e., the set of all rotation matrices) can be identified as $T_R SO_3^N = R\tilde{\Omega}$, and the affine tangent space is $T_R^{aff} SO_3^N = R + R\tilde{\Omega}$.

In order to optimize the cost function on the product manifold $SO_3^N$, the product manifold can be locally parameterized at a neighborhood of a point R on the product manifold $SO_3^N$. If $N(0) \subset R^3$ denotes a sufficiently small neighborhood of the origin in $R^3$, and $R_i \in SO_3$, an exponential mapping $\mu$ is a local diffeomorphism from $N(0)$ onto a neighborhood of $R_i$ in $SO_3$. This exponential mapping $\mu$ can be expressed as:

$$\mu : N(0) \subset R^3 \to SO_3, \omega_i \mapsto R_i e^{\Omega_i(\omega_i)}. \quad (22)$$

As expressed in Equation 22, the exponential mapping $\mu$ converts a three dimensional vector $\omega_i$ into a point on the $SO_3$ manifold in the neighborhood of $R_i$ using skew symmetric matrix corresponding to the three dimensional vector $\omega_i$. Similarly, due to the above described isomorphism, an exponential mapping $\phi$ can be used to locally parameterize the product manifold $SO_3^N$ at $R \in SO_3^N$. This exponential mapping $\phi$ can be expressed as:

$\phi : N(0) \times \ldots \times N(0) \subset R^{3N} \to SO_3^N$, $$\omega = \begin{bmatrix} \omega_1 \\ \omega_2 \\ \vdots \\ \omega_N \end{bmatrix} \mapsto R(e^{\Omega(\omega_1)} \oplus e^{\Omega(\omega_2)} \oplus \ldots \oplus e^{\Omega(\omega_N)}) = Re^{\tilde{\Omega}(\omega)}. \quad (23)$$

As expressed in Equation 23, the exponential mapping $\phi$ converts a 3N dimensional vector to point on the product manifold $SO_3^N$ in the neighborhood of R.

Figure 2:
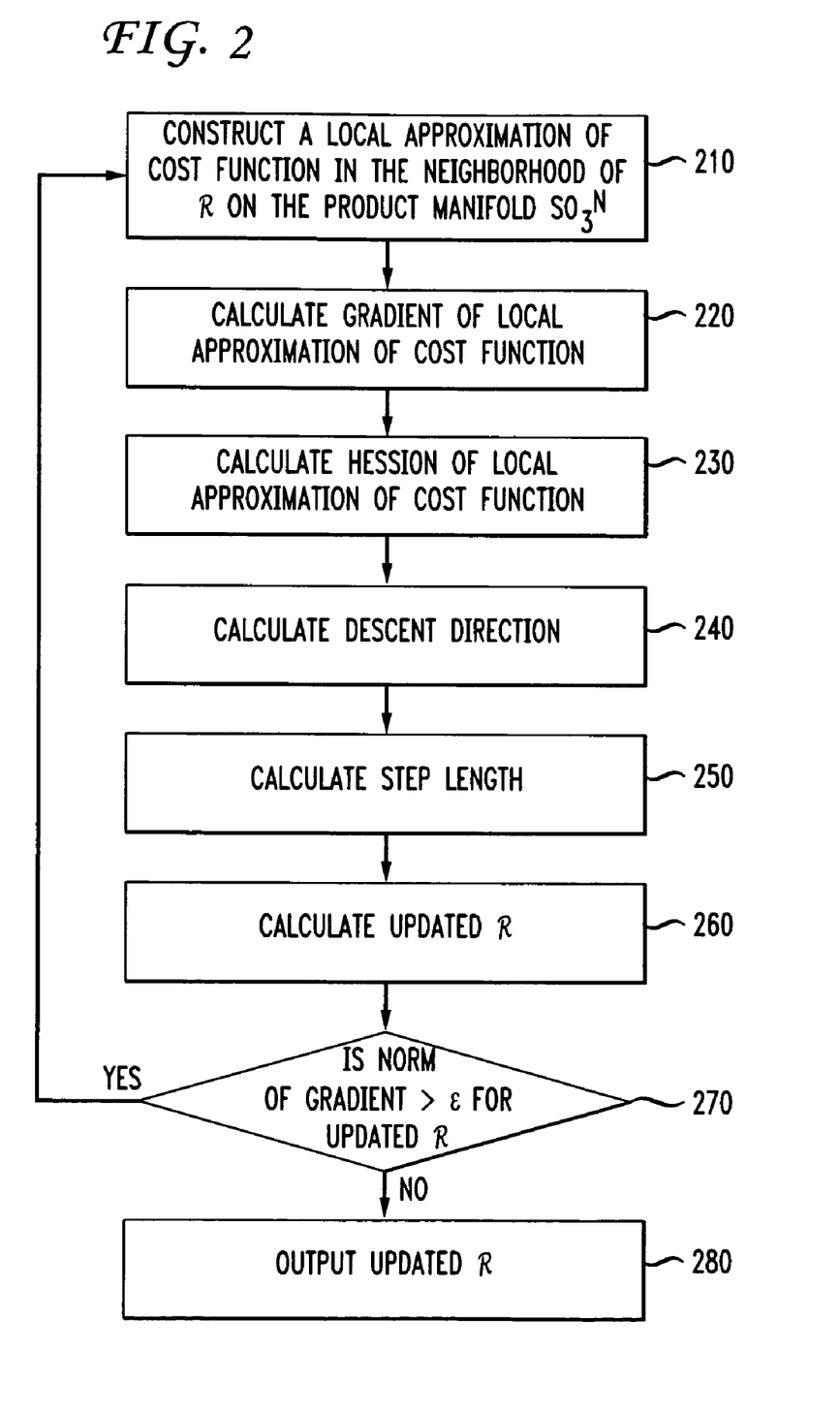
FIG. 2 illustrated an iterative process of optimizing a cost function to determine optimal values of rotation matrices according to an embodiment of the present invention.

In order to obtain optimal values for the rotation matrices, an iterative optimization method is performed to minimize the cost function while remaining on the product manifold $SO_3^N$, using the properties of the $SO_3^N$ manifold described above. FIG. 2 further describes step 120 of FIG. 1. That is, FIG. 2 illustrates a method of optimizing the cost function on the product manifold $SO_3^N$ according to an embodiment of the present invention.

At step 210, a local approximation of the cost function f (Equation 11) in the neighborhood of R on the product manifold $SO_3^N$ is constructed. The local approximation of f can be calculated using a second order Taylor expansion. Instead of differentiating f, the local parameterization of $SO_3^N$ can be used to locally approximate the function $f \circ \phi$, whose domain is $R^{3N}$. The use of the local parameterization $\phi$ ensures that the optimization method stays on the manifold. During the first iteration of the optimization method, the R is the rotational matrices having the initial values determined at step 110. For each subsequent iteration, the value of R is updated.

The second order Taylor approximation of $f \circ \phi$ is given by the function:

$$j_0^{(2)}(f \circ \varphi) : R^{3N} \to R, \quad (24)$$

$$\omega \mapsto \left( (f \circ \varphi)(t\omega) + \frac{d}{dt}(f \circ \varphi)(t\omega) + \frac{1}{2}\frac{d^2}{dt^2}(f \circ \varphi)(t\omega) \right)\Big|_{t=0}.$$

As with a univariate Taylor expansion, the above expression can be written in the form $(f \circ \phi)(t\omega) + \omega^T \nabla + \frac{1}{2}\omega^T H\omega$, where $\nabla$ is the gradient and H is the Hessian of the function $f \circ \phi$. Accordingly, the first term of the cost function as expressed in Equation 11 is $(f \circ \phi)(t\omega)|_{t=0} = tr(RMR^T)$. The second term is:

$$\frac{d}{dt}(f \circ \varphi)(t\omega)\Big|_{t=0} = 2\,tr(R\tilde{\Omega}MR^T) \quad (25)$$
$$= 2\omega^T \nabla(f \circ \varphi)(0)$$

Furthermore, $tr(R\tilde{\Omega}MR^T)$ can be written as $vec^T(\tilde{\Omega}R^T)\,vec(MR^T)$. Thus, $$vec^T(\tilde{\Omega}R^T) = [vec(\tilde{\Omega}R^T)]^T \quad (26)$$
$$= [vec(I_{3N}\tilde{\Omega}R^T)]^T$$
$$= [(R \otimes I_{3N})vec(\tilde{\Omega})]^T$$

At step 220, the gradient $\nabla$ of the local approximation of the cost function $f \circ \phi$ is calculated at R. R is set to the initial values determined at step 110 during the first iteration of the optimization method, and is updated for each subsequent iteration. If $\tilde{Q} := Q_{e_1} \oplus Q_{e_2} \oplus \ldots \oplus Q_{e_N}$, and $$Q_{e_i} := \begin{bmatrix} e_i & \otimes & Q_x \\ e_i & \otimes & Q_y \\ e_i & \otimes & Q_z \end{bmatrix},$$

then using Equation 18 and the fact that $vec(\tilde{\Omega}) = \tilde{Q}\omega$, Equation 26 can be expressed as $vec^T(\tilde{\Omega}R^T) = \omega^T J$, wherein $J := (R \otimes I_{3N})\tilde{Q}$. Substituting this back into Equation 25, the gradient $\nabla f$ the local approximation of the cost function $f \circ \phi$ can be expressed as:

$$\nabla(f \circ \phi)(0) = J^T vec(MR^T). \quad (27)$$

At step 230, the Hessian H of the local approximation of the cost function $f \circ \phi$ is calculated. The quadratic term in Equation 11 consists of a sum of two terms. The first term can be expressed as:

$$tr(R\tilde{\Omega}M\tilde{\Omega}^T R^T) = \omega^T \hat{H}_{(f \circ \phi)(0)}\omega. \quad (28)$$

The second term can be expressed as:

$$tr(R\tilde{\Omega}^2 MR^T) = vec^T(MR^T R\tilde{\Omega}). \quad (29)$$
$$= \omega^T \tilde{H}_{(f \circ \varphi)(0)}\omega$$

By applying similar methods as used to obtain the gradient $\nabla$, the Hessian H of the local approximation of the cost function $f \circ \phi$ can be evaluated at zero, as expressed below:

$$H_{(f \circ \phi)(0)} = \hat{H}_{(f \circ \phi)(0)} + \tilde{H}_{(f \circ \phi)(0)}, \quad (30)$$

wherein, $$\hat{H}_{(f \circ \phi)(0)} = J^T(I_3 \otimes M)J \leq 0 \quad (31)$$

$$\tilde{H}_{(f \circ \phi)(0)} = -\tilde{Q}^T(I_{3N} \otimes MR^T R)\tilde{Q}. \quad (32)$$

As expressed in Equations 30-32, H is the sum of the positive semidefinite term $\hat{H}$ and the term $\tilde{H}$.

At step 240, a descent direction $\omega_{opt}$ is calculated based on the gradient $\nabla$ and the Hessian H of the local approximation of the cost function $f \circ \phi$. At step 250, a step length $\lambda_{opt}$ is calculated based on the descent direction $\omega_{opt}$. The optimization method comprises the iteration, $$s = \pi_2 \circ \pi_1 : SO_3^N \to SO_3^N. \tag{33}$$

In Equation 33, $\pi_1$ maps a point R on the product manifold $SO_3^N$ to an element in the tangent space at the point R that minimizes $j_0^{(2)}(f \circ \phi)(0)$, and $\pi_2$ maps the element back to $SO_3^N$ using the parameterization $\phi$. The mapping $\pi_1$ is an iterative scheme that uses a modified Newton method to determine the descent direction $\omega_{opt}$, and a line search to move along this direction. The steps of calculating the descent direction $\omega_{opt}$ and the step length $\lambda_{opt}$ are described by the mapping:

$$\pi_1 = \pi_1^b \circ \pi_1^a : SO_3^N \to R^{3N \times 3N}. \tag{34}$$

Figure 3:
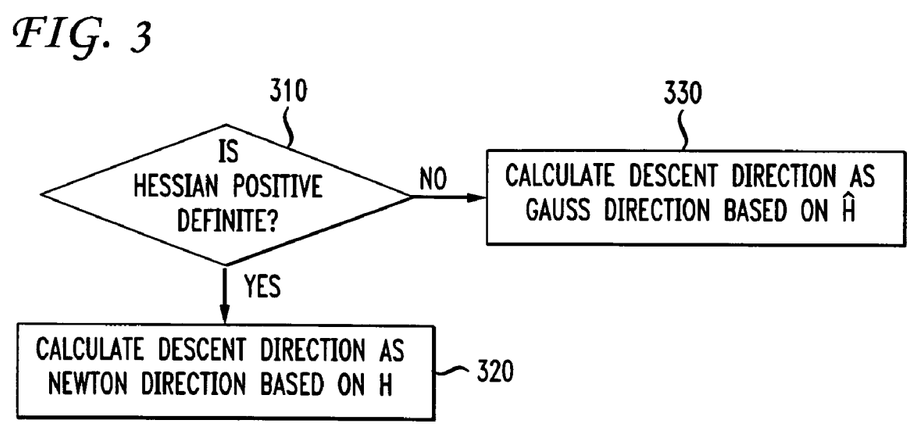
FIG. 3 illustrates a method of calculating a descent direction according to an embodiment of the present invention.

The mapping $\pi_1^a$ is used to calculate the descent direction $\omega_{opt}$, wherein $\pi_1^a : SO_3^N \to R^{3N \times 3N}$, $R \mapsto R + R\tilde{\Omega}(\omega_{opt})$. FIG. 3 further describes step 240 of FIG. 2. That is, FIG. 3 illustrates a method of calculating the descent direction $\omega_{opt}$ according to an embodiment of the present invention. At step 310 it is determined whether the Hessian H of the local approximation of the cost function is positive definite. If H is determined to be positive definite at step 310, at step 320, the descent direction $\omega_{opt}$ is calculated as a Newton direction based H and $\nabla$. In this case, the descent direction $\omega_{opt}$ can be expressed as:

$$\omega_{opt}(\phi(\omega)) = -H_{(f \circ \phi)(\omega)}^{-1} \nabla (f \circ \phi)(\omega). \tag{35}$$

If H is determined not to be positive definite at step 310, at 300, the descent direction is calculated as a Gauss direction based on $\hat{H}$ and $\nabla$. In this case the descent direction can be expressed as:

$$\omega_{opt}(\phi(\omega)) = -\hat{H}_{(f \circ \phi)(\omega)}^{-1} \nabla (f \circ \phi)(\omega). \tag{36}$$

Since H can be decomposed as a sum of a positive definite term ($\hat{H}$) and another term ($\tilde{H}$), it is possible to use the only the positive definite term ($\hat{H}$) to determine the descent direction $\omega_{opt}$ when H is not positive definite.

Returning to FIG. 2, once the descent direction $\omega_{opt}$ is calculated (step 240), the step length $\lambda_{opt}$ is calculated based on the descent direction $\omega_{opt}$ (step 250). The step length $\lambda_{opt}$ can be calculated using an appropriate one dimensional line search carried out in the descent direction $\omega_{opt}$, and denoted by the mapping $\pi_1^b$. The line search can be a backtracking line search used to ensure that the cost function is reduced with every iteration. Since the backtracking line search is carried out in the descent direction $\omega_{opt}$, choosing a sufficiently small step size will ensure that the cost function is reduced. In order to select a sufficiently small step size, it is possible that the backtracking line search first try a step size of 1, and if this is unacceptable, reduce the step size until an acceptable step length $\lambda_{opt}$ is found. Thus, $$\pi_1^b : R^{3N \times 3N} \to R^{3N \times 3N}, \tag{37}$$
$$R + R\tilde{\Omega}(\omega_{opt}) \mapsto R + R\tilde{\Omega}(\lambda_{opt}\omega_{opt})$$

where $\lambda_{opt}$ is the step length that reduces the cost function in the descent direction $\omega_{opt}$, and is found using a backtracking line search.

At step 260, an updated value of R is calculated using the descent direction $\omega_{opt}$ and the step length $\lambda_{opt}$ calculated at step 240 and 250, respectively. That is, a point (i.e., the updated value of R) on the product manifold $SO_3^N$ in the neighborhood of R, which reduces the cost function, is determined based on the descent direction $\omega_{opt}$ and the step length $\lambda_{opt}$ via the parameterization $\pi_2 : R^{3N \times 3N} \to SO_3^N$:

$$R + \tilde{\Omega}(\lambda_{opt}\omega_{opt}) \mapsto Re^{\tilde{\Omega}(\lambda_{opt}\omega_{opt})} = \tag{38}$$
$$R\left(e^{(\Omega_1(\lambda_{opt}\omega_1^{opt}))} \oplus \ldots \oplus e^{(\Omega_N(\lambda_{opt}\omega_N^{opt}))}\right)$$

Since $$\omega_{opt} = \left[\omega_1^{opt^T} \ldots \omega_N^{opt^T}\right]^T.$$

Accordingly, using Equation 38, an updated value for R is determined which is on the manifold based on the descent direction and the step length calculated to reduce the cost function. As the local approximation of the cost function $f \circ \phi$ is reduced, the norm of the gradient $\nabla$ of the local approximation of the cost function $f \circ \phi$ approached zero. Thus, at step 270, it is determined whether the norm of the gradient $\nabla$ of the local approximation of the cost function $f \circ \phi$ is greater than an error threshold $\epsilon$ (i.e., $\|\nabla(f \circ \phi)(0)\| > \epsilon$). If the norm of the gradient $\nabla$ of the local approximation of the cost function $f \circ \phi$ is greater than the error threshold $\epsilon$, than the cost function must be reduced further, and the method returns to step 210, using the updated value of R as R. If the norm of the gradient $\nabla$ of the local approximation of the cost function $f \circ \phi$ is not greater than an error threshold $\epsilon$, then the method does to step 280. At step 280, the updated value of R is output as the optimal value of R for minimizing the cost function. Accordingly, optimal values are determined for each of the rotation matrices corresponding to the 3D point sets of multiple views.

Returning to FIG. 1, at step 130, optimal values of the translation vectors corresponding to the 3D point sets of the multiple views are calculated based on the determined optimal values of the rotation matrices. That is, an optimal value of T is calculated based on the optimal value of R using Equation 10. Accordingly, using the optimal translation vectors and rotation matrices corresponding to each view, the 3D point sets of the views can be registered onto the reference coordinate frame to construct a 3D model of an object.

Figure 4:
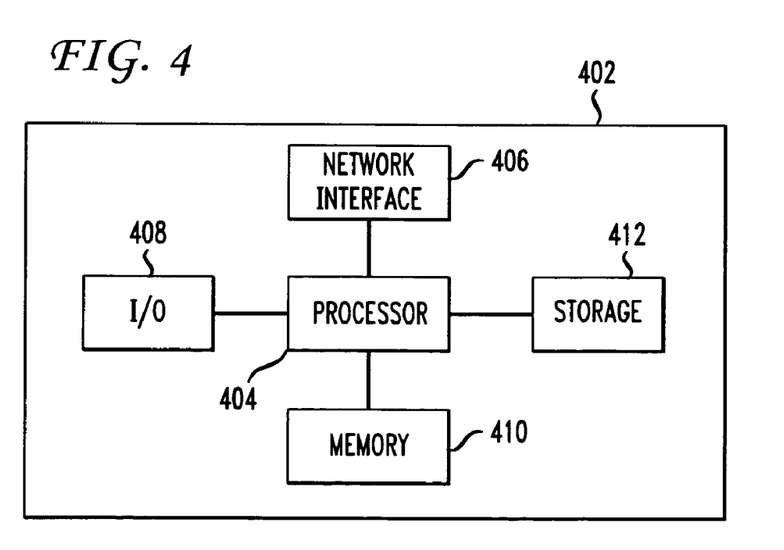
FIG. 4 illustrates a computer system configured to perform an embodiment of the present invention.

The global registration method of multiple 3D point sets, as described above, can be implemented on a computer using well known computer processors, memory units, storage devices, computer software, and other components. A high level block diagram of such a computer is illustrated in FIG. 4. Computer 402 contains a processor 404 which controls the overall operation of the computer 402 by executing computer program instructions which define such operation. The computer program instructions may be stored in a storage device 412 (e.g., magnetic disk) and loaded into memory 410 when execution of the computer program instructions is desired. Thus, the iterative optimization method used to determine optimal values of rotational matrices for the 3D point sets can be defined by the computer program instructions stored in the memory 410 and/or storage 412 and controlled by the processor 404 executing the computer program instructions. The computer 402 also includes one or more network interfaces 406 for communicating with other devices via a network. The computer 402 also includes input/output 408 which represents devices which allow for user interaction with the computer 402 (e.g., display, keyboard, mouse, speakers, buttons, etc.) One skilled in the art will recognize that an implementation of an actual computer will contain other components as well, and that FIG. 4 is a high level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for registering a plurality of 3D point sets by determining optimal relative positions and orientations of the 3D point sets, comprising:
   generating, by one or more scanners, a plurality of 3D point sets, each 3D point set representing a view of a surface of an object;
   determining initial values of rotation matrices corresponding to the 3D point sets based on correspondence values of the 3D point sets;
   optimizing a cost function on a product manifold of the rotation matrices using the initial values to determine optimal values of the rotation matrices; and
   calculating optimal values of translation vectors corresponding to the 3D point sets based on the optimal values of the rotation matrices;
   wherein the optimizing step comprises:
     calculating updated values of the rotation matrices based on the initial values to reduce a value of the cost function;
     determining whether the cost function is locally minimized based on the updated values;
     if the cost function is not minimized, setting the initial values to be the updated values and repeating the optimizing step; and
     if the cost function is minimized, determining the updated values to be the optimal values of the rotation matrices;
   wherein the step of calculating updated values of the rotation matrices comprises:
     constructing a local approximation of the cost function in a neighborhood of the initial values on the product manifold;
     calculating a gradient of the local approximation of the cost function;
     calculating a Hessian of the local approximation of the cost function;
     calculating a descent direction based on the gradient of the local approximation of the cost function and the Hessian of the local approximation of the cost function;
     calculating a step length to reduce the cost function based on the calculated descent direction; and
     calculating the updated values on the product manifold using the descent direction and the step length.

2. The method of claim 1, wherein the step of determining initial values of rotation matrices comprises:
   determining the initial values using a closed form solution for optimal values of the rotation matrices in a noise free case.

3. The method of claim 1, wherein the step of determining initial values of rotation matrices comprises:
   constructing a matrix M based on the correspondence values;
   determining singular vectors of the matrix M; and
   determining the initial values based on the singular vectors.

4. The method of claim 1, wherein the constructing step comprises:
   constructing the local approximation of the cost function in the neighborhood of the initial values using a second order Taylor expansion.

5. The method of claim 1, wherein the step of calculating a descent direction comprises:
   if the Hessian of the local approximation of the cost function is positive semidefinite, calculating the descent direction based on the gradient and the Hessian of the local approximation of the cost function; and
   if the Hessian of the local approximation of the cost function is not positive semidefinite, calculating the descent direction based on the gradient and a positive semidefinite portion of the Hessian of the local approximation of the cost function.

6. The method of claim 1, wherein the step of calculating a step length comprises:
   performing a backtracking line search in the calculated descent direction.

7. The method of claim 1, wherein the step of calculating updated values of the rotational matrices comprises:
   using the calculated descent direction and step length to map to a point on the product manifold in the neighborhood of the initial values via a local parameterization of the product manifold in the neighborhood of the initial values.

8. The method of claim 1, wherein the step of determining whether the cost function is locally minimized comprises:
   comparing a norm of the gradient of the local approximation of the cost function for the updated values of the rotation matrices to an error threshold;
   if the norm of the gradient of the local approximation of the cost function for the updated values of the rotation matrices is greater than the error threshold, determining that the cost function is not minimized; and
   if the norm of the gradient of the local approximation of the cost function for the updated values of the rotation matrices is less than or equal to the error threshold, determining that the cost function is minimized.

9. A method for registering a plurality of 3D point sets by determining optimal relative positions and orientations of the 3D point sets, comprising:
   generating, by one or more scanners, a plurality of 3D point sets, each 3D point set representing a view of a surface of an object;
   determining initial values of rotation matrices corresponding to the 3D point sets based on correspondence values of the 3D point sets;
   optimizing a cost function on a product manifold of the rotation matrices using the initial values to determine optimal values of the rotation matrices; and
   calculating optimal values of translation vectors corresponding to the 3D point sets based on the optimal values of the rotation matrices;
   wherein the cost function is a function representing registration error between common points in overlapping 3D point sets.

10. The method of claim 9, wherein the cost function represents least squares registration error.

11. A computer readable medium storing computer program instructions for performing a method for registering a plurality of 3D point sets by determining optimal relative positions and orientations of the 3D point sets, the computer program instructions defining the steps of:

determining initial values of rotation matrices corresponding to the 3D point sets based on correspondence values of the 3D point sets;

optimizing a cost function on a product manifold of all of the rotation matrices using the initial values to determine optimal values of the rotation matrices; and calculating optimal values of translation vectors corresponding to the 3D point sets based on the optimal values of the rotational matrices;

wherein the computer program instructions defining the optimizing step further define the steps of:

constructing a local approximation of the cost function in a neighborhood of the initial values on the product manifold;

calculating a gradient of the local approximation of the cost function;

calculating a Hessian of the local approximation of the cost function;

calculating a descent direction based on the gradient of the local approximation of the cost function and the Hessian of the local approximation of the cost function;

calculating a step length to reduce the cost function based on the calculated descent direction;

calculating updated values of the rotation matrices on the product manifold using the descent direction and the step length.

12. The computer readable medium of claim 11, wherein the computer program instructions defining the step of determining initial values of rotation matrices further define the step of:

determining the initial values using a closed form solution for optimal values of the rotation matrices in a noise free case.

13. The computer readable medium of claim 11, wherein the computer program instructions defining the step of determining initial values of rotation matrices further define the steps of:

constructing a matrix M based on the correspondence values;

determining singular vectors of the matrix M constructed based on the correspondence values; and determining the initial values based on the singular vectors.

14. The computer readable medium of claim 11, wherein the computer program instructions defining the constructing step further define the step of:

constructing the local approximation of the cost function in the neighborhood of the initial values using a second order Taylor expansion.

15. The computer readable medium of claim 11, wherein the computer program instructions defining the step of calculating a descent direction further define the steps of:

if the Hessian of the local approximation of the cost function is positive semidefinite, calculating the descent direction based on the gradient and the Hessian of the local approximation of the cost function; and if the Hessian of the local approximation of the cost function is not positive semidefinite, calculating the descent direction based on the gradient and a positive semidefinite portion of the Hessian of the local approximation of the cost function.

16. The computer readable medium of claim 11, wherein the computer program instructions defining the step of calculating a step length further define the step of:

performing a backtracking line search in the calculated descent direction.

17. The computer readable medium of claim 11, wherein the computer program instructions defining the step of calculating updated values of the rotational matrices further define the step of:

using the calculated descent direction and step length to map to a point on the product manifold in the neighborhood of the initial values via a local parameterization of the product manifold in the neighborhood of the initial values of the rotation matrices.

18. The computer readable medium of claim 11, wherein the computer program instructions defining the optimizing step further define the steps of:

comparing a norm of the gradient of the local approximation of the cost function for the updated values of the rotation matrices to an error threshold;

if the norm of the gradient of the local approximation of the cost function for the updated values of the rotation matrices is greater than the error threshold, setting the initial values of the rotation matrices to be the updated values of the rotation matrices and repeating the optimizing step; and if the norm of the gradient of the local approximation of the cost function for the updated values of the rotation matrices is less than or equal to the error threshold, determining the updated values of the rotation matrices to be the optimal values of the rotation matrices.

19. A system comprising:

means for determining initial values of rotation matrices corresponding to 3D point sets based on correspondence values of the 3D point sets;

means for optimizing a cost function on a product manifold of all of the rotation matrices using the initial values to determine optimal values of the rotation matrices; and means for calculating optimal values of translation vectors corresponding to the 3D point sets based on the optimal values of the rotation matrices;

wherein the means for optimizing comprises:

means for constructing a local approximation of the cost function in a neighborhood of the initial values on the product manifold;

means for calculating a gradient of the local approximation of the cost function;

means for calculating a Hessian of the local approximation of the cost function;

means for calculating a descent direction based on the gradient of the local approximation of the cost function and the Hessian of the local approximation of the cost function;

means for calculating a step length to reduce the cost function based on the calculated descent direction; and means for calculating updated values of the rotational matrices on the product manifold using the descent direction and the step length.

20. The system of claim 19, wherein the means for constructing comprises:

means for constructing the local approximation of the cost function in the neighborhood of the initial values using a second order Taylor expansion.

21. The system of claim 19, wherein the means for calculating a descent direction comprises:

means for calculating a first descent direction based on the gradient and the Hessian of the local approximation of the cost function;

means for calculating a second descent direction based on the gradient and a positive semidefinite portion of the Hessian of the local approximation of the cost function; and means for selecting one of the first and second descent directions based on whether the Hessian of the local approximation of the cost function is positive semidefinite.

22. The system of claim 19, wherein the means for calculating a step length comprises:

means for performing a backtracking line search in the calculated descent direction.

23. The system of claim 19, wherein the means for calculating updated values of the rotational matrices comprises:

means for using the calculated descent direction and step length to map to a point on the product manifold in the neighborhood of the initial values via a local parameterization of the product manifold in the neighborhood of the initial values.

* * * * *